(12) United States Patent
McGinn et al.

(10) Patent No.: US 7,340,400 B2
(45) Date of Patent: Mar. 4, 2008

(54) VEHICLE ACTIVITY MODULE

(75) Inventors: Dennis McGinn, Palo Alto, CA (US); Suman Cherukuri, San Mateo, CA (US)

(73) Assignee: Performance Analytics, Inc., Palo Alto, CA (US)

( * ) Notice: Subject to any disclaimer, the term of this patent is extended or adjusted under 35 U.S.C. 154(b) by 809 days.

(21) Appl. No.: 10/734,513

(22) Filed: Dec. 12, 2003

(65) Prior Publication Data

US 2004/0128159 A1     Jul. 1, 2004

Related U.S. Application Data

(60) Provisional application No. 60/319,773, filed on Dec. 12, 2002.

(51) Int. Cl.
*G06Q 10/00* (2006.01)
*G05B 19/00* (2006.01)

(52) U.S. Cl. ............................... 705/1; 340/5.8
(58) Field of Classification Search ............ 705/1; 206/335; 340/5.8
See application file for complete search history.

(56) References Cited

U.S. PATENT DOCUMENTS

| | | |
|---|---|---|
| 3,599,454 A | 8/1971 | Hill et al. |
| 3,695,067 A | 10/1972 | Bays |
| 3,742,741 A | 7/1973 | Cahan |
| 3,827,038 A | 7/1974 | Willis |
| 3,969,584 A | 7/1976 | Miller et al. |
| 4,112,421 A | 9/1978 | Freeny, Jr. |
| 4,148,012 A | 4/1979 | Baump et al. |
| 4,187,497 A | 2/1980 | Howell et al. |
| 4,209,787 A | 6/1980 | Freeny, Jr. |
| 4,217,588 A | 8/1980 | Freeny, Jr. |

(Continued)

FOREIGN PATENT DOCUMENTS

DE     3908029 A1     9/1990

(Continued)

OTHER PUBLICATIONS

Mickadeit, Frank, Crime Ring; Police seek car thieves whi batter walls of dealerships in heists, Apr. 23, 1992, The Orange County Register, METRO; p. B05, pp. 1-3.*

(Continued)

*Primary Examiner*—Jamisue Plucinski
(74) *Attorney, Agent, or Firm*—Scott A. Felder; Wiley Rein, LLP

(57) ABSTRACT

A system (10) is disclosed for maintaining security and data gathering for a number of vehicles. The system (10) includes a vehicle activity module (12) for each of the vehicles (2), the vehicle activity module (12) including a wireless transmitter (18), at least one ID reader (50), and activity sensors (50,62,70), and a central computer (22) having a database (24) for data storage, the central computer (22) being in wireless communication with each of the vehicle activity modules (12). The system (10) also includes key ID tags (74), which are attached to vehicle keys (16), and personal ID cards (60) which are issued to sales, maintenance and service personnel. Information is read from personal ID cards (60) and key ID tags (74) by the activity sensors (50,62,70) and is transmitted to the central computer (22) for authorization of access and recording of access activity, and for storage and analysis.

56 Claims, 10 Drawing Sheets

U.S. PATENT DOCUMENTS

| | | | |
|---|---|---|---|
| 4,218,763 | A | 8/1980 | Kelley et al. |
| 4,631,358 | A | 12/1986 | Newcome, III et al. |
| 4,636,950 | A | 1/1987 | Caswell et al. |
| 4,673,932 | A | 6/1987 | Ekchian et al. |
| 4,727,368 | A | 2/1988 | Larson et al. |
| 4,808,993 | A | 2/1989 | Clark |
| 4,838,052 | A | 6/1989 | Williams et al. |
| 4,851,652 | A | 7/1989 | Imran |
| 4,897,630 | A | 1/1990 | Nykerk |
| 4,914,732 | A | 4/1990 | Henderson et al. |
| 4,916,443 | A | 4/1990 | Barrett et al. |
| 4,988,987 | A | 1/1991 | Barrett et al. |
| 5,231,273 | A | 7/1993 | Caswell et al. |
| 5,245,652 | A | 9/1993 | Larson et al. |
| 5,280,518 | A | 1/1994 | Danler et al. |
| 5,289,177 | A | 2/1994 | Wake |
| 5,315,285 | A | 5/1994 | Nykerk |
| 5,365,516 | A | 11/1994 | Jandrell |
| 5,398,016 | A | 3/1995 | Burayez |
| 5,463,371 | A | 10/1995 | Fuller |
| 5,475,375 | A | 12/1995 | Barrett et al. |
| 5,563,579 | A | 10/1996 | Carter ........................ 340/539 |
| 5,602,536 | A | 2/1997 | Henderson et al. |
| 5,612,668 | A | 3/1997 | Scott |
| 5,815,557 | A | 9/1998 | Larson |
| 6,104,309 | A | 8/2000 | Ozawa |
| 6,472,973 | B1* | 10/2002 | Harold et al. .............. 340/5.73 |
| 6,611,232 | B1 | 8/2003 | Wunderlich et al. ........ 342/387 |
| 6,737,961 | B2* | 5/2004 | Flick ...................... 340/426.35 |
| 7,009,489 | B2* | 3/2006 | Fisher ........................ 340/5.7 |
| 2002/0044055 | A1* | 4/2002 | Maloney ..................... 340/571 |
| 2002/0075154 | A1* | 6/2002 | Maloney .................. 340/573.1 |
| 2002/0147981 | A1* | 10/2002 | Ohta et al. ..................... 725/93 |
| 2003/0179075 | A1* | 9/2003 | Greenman ................. 340/5.54 |
| 2004/0025039 | A1* | 2/2004 | Kuenzi et al. .............. 713/193 |
| 2004/0160304 | A1 | 8/2004 | Mosgrove et al. |

FOREIGN PATENT DOCUMENTS

| | | |
|---|---|---|
| EP | 0 366 378 B1 | 8/1993 |
| GB | 2198270 A1 | 6/1988 |
| GB | 2218243 A1 | 8/1989 |
| GB | 2220778 A1 | 1/1990 |
| JP | 06-097863 | 8/1994 |
| WO | WO 92/10387 | 6/1992 |
| WO | WO 93/12010 | 6/1993 |

OTHER PUBLICATIONS

Caristi, Anthony J., Build a Multi-Function Car Security System, *Popular Electronics*, v. 11 Oct. 1994, pp. 47-54, 95.

GE Supra, GE Supra Announces New KeyAdvantage Electronic KeyBox System for Auto Dealership; Quick, Easy and Security Vehicle Access Enhances the Sales Process and Protects Dealer Assets, *Supra Press Release*, web print-out, Nov. 3, 2003; KeyAdvantage; GE Industrial web print-out, Aug. 12, 2004.

Young, Stanley, No-Jacks, New High-tech Anticarjacking Gizmos Even James Bond Would Envy, Los Angeles, v. 38 Oct. 1993.

Xu, Jintian, Multiple-purpose, Multiple-link Anti-theft Alarm, *Electronic Engineering*, v. 64 Nov. 1992. (Abstract).

Teitelman, Robert, Digital Dragnet, Forbes, Nov. 4, 1985.

* cited by examiner

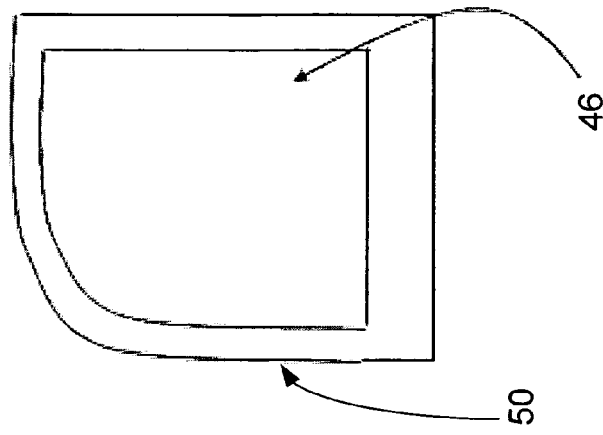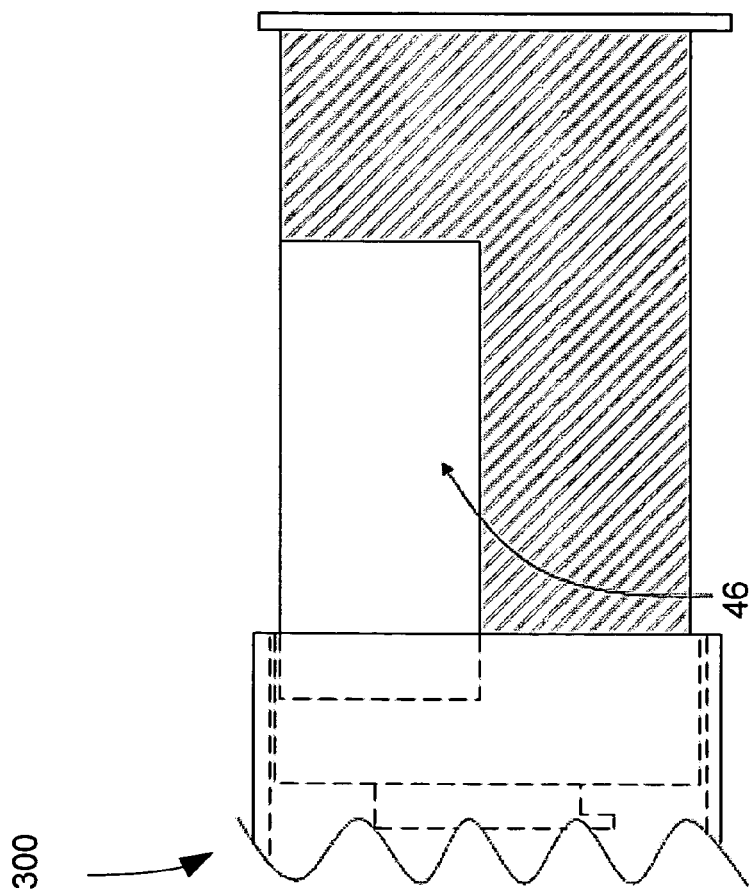

VEHICLE ACTIVITY MODULE

This application claims priority to provisional application 60/319,773 filed Dec. 12, 2002 to the present inventors.

TECHNICAL FIELD

The present invention relates generally to a system and apparatus for monitoring activity in a fleet of vehicles for purposes of security, inventory control and management analysis.

BACKGROUND ART

Car dealerships and other agencies that deal with large groups of vehicles must have a system for tracking and maintaining security in their vehicles, as well as being able to make projections of the interest by the public in varying types and models. This type of information is important for sales planning and ordering, and includes not only the sales of certain models, but information on how many test drives are taken, etc.

There are also problems that dealerships have in controlling the keys to their vehicles. It can be inconvenient for sales personnel to return to a central office and locate the keys to a certain vehicle when a customer is interested in driving it or perhaps merely viewing the interior and its accessories. There are thus obvious advantages to having the keys to vehicles kept with them so they may be easily accessed by sales personnel whenever they are needed. There are of course also the obvious dangers of keeping the keys with the car in terms of possible theft and vandalism.

In response to this need, there have been several attempts in the prior art to provide secure key boxes on the vehicles. U.S. Pat. No. 5,563,579 to Carter discloses a key storage device mounted to each vehicle window which has a compartment for storing access keys. The storage device also has a sensing device which provides a signal to indicate whether an event is routine or hostile. A second device may be permanently attached to the vehicle for regularly transmitting identifying information as to that vehicle. Both devices report the information by radio through an intermediate transmitter network to a computer D inside the dealership which records the information along with the time of the event. The information is stored for subsequent retrieval for the purpose of generating reports useful to the dealership management. If an event is hostile, appropriate action may be taken including suitable signaling.

U.S. Pat. No. 6,611,232 to Wunderlich discloses a lock box unit mounted on a vehicle which includes a key box for storing a vehicle key and a locator unit. The locator unit receives a polling signal from a central base station which includes an address for the particular locator unit to be located. The location of the locator unit and the vehicle is determined based upon time arrival data generated by the receiving antennas. The lock box unit may also include an identification device which records who accesses the key box to retrieve the vehicle key. This information is stored in a memory device.

Despite these advances, problems still remain with the security of vehicles and the necessity for frequent replacement of batteries. Prior art systems such as Carter have used a pulse generator connected to the antenna doing a roll call to ask their boxes if they have a request or a problem to report. In this case, the boxes would always have to be "listening" and would render the idea of battery powered modules useless, as the drain on the batteries would require them to be frequently serviced. As an alternative, they could be configured to power the box from the car battery, but this is also problematic in locating the box on the drivers window and being able to remove it quickly with no wires.

In addition, it has been found that these earlier systems may be easily disabled by a moderate blows to the modules, and due to the nature of the alarm reporting, the damage may not be noticed immediately.

Thus there is a need for a system which has effective and proactive security features and allows the use of battery powered devices that do not require frequent servicing.

DISCLOSURE OF INVENTION

Accordingly, it is an object of the present invention to provide increased security for vehicles in a vehicle fleet system which includes the bright flashing of a very visible red LED on all vehicles at regular intervals and any time the VAM module is disturbed when not temporarily suspended by valid access event.

Another object of the invention is to enable automatic alerting of designated individuals by internet/email/cell phone when there is a security violation And another object of the invention is to provide and integrated and self sustaining power system in each module which requires less servicing than prior systems.

A further object of the invention is to provide VAMs which exist in a light sleep mode with the ability to react in milliseconds to any interrupt (disturbance/request for access).

An additional object of the present invention is to provide a security system in which each VAM asks for attention when needed including waking up at programmed (and controllable) intervals such as every 30 minutes during business hours and every 5 minutes at night so that there is an AWOL/MIA default to generate an alert.

A further object of the present invention is to provide a system where information such as frequency of VAM access is used to generate reports which can be used for inventory planning, sales strategies and management decisions.

Briefly, one preferred embodiment of the present invention is a system for maintaining security and data gathering for a number of vehicles. The system includes a vehicle activity module for each of the vehicles, the vehicle activity module including a wireless transmitter, at least one ID reader, and activity sensors, and a central computer having a database for data storage, the central computer being in wireless communication with each of the vehicle activity modules. The system also includes key ID tags, which are attached to vehicle keys, and personal ID cards which are issued to sales, maintenance and service personnel. Information is read from personal ID cards and key ID tags attached to keys by the activity sensors and is transmitted to the central computer for authorization of access and recording of access activity, and for storage and analysis.

Also disclosed are vehicle activity modules, and methods for collecting and analyzing data on vehicle access, and for maintaining security for a plurality of vehicles.

An advantage of the present invention is that access to keys granted or denied in real time Another advantage of the present invention is that access is locked out after hours except for master cards And another advantage of the present invention is that all users are identified and tracked.

A further advantage of the present invention is that the access key is electronic (RFID) and encrypted to avoid copying A yet further advantage is that each key set also has an RFID tag attached for completely unique identity tracking with each access and return Another advantage is that the power source is always available and independent, and provides regulated power to keep the electronics operational.

A further advantage is that rechargeable batteries provide a renewable energy source with daily solar re-charge of the battery pack, and battery strength is reported every few minutes for advanced notice if a battery is failing. Battery packs are easily replaceable by the dealer.

Another advantage is that the present system provides wireless tampering alerts in real time.

And another advantage is that the present system sends a vehicle specific alert (by vehicle description & VIN) immediately to a dealer designated security surveillance center. The same information can be also be sent immediately to cell phone(s) as an urgent message or by e-mail.

A yet further advantage is that VAM units which are still checked in but not reporting in at regular (5 minute) time interval will generate an immediate alarm as a fail safe These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIGS. 4A and B show side plan views and end plan views of the vehicle activity module of the present invention in an open position;

BEST MODE FOR CARRYING OUT THE INVENTION

Figure 1:
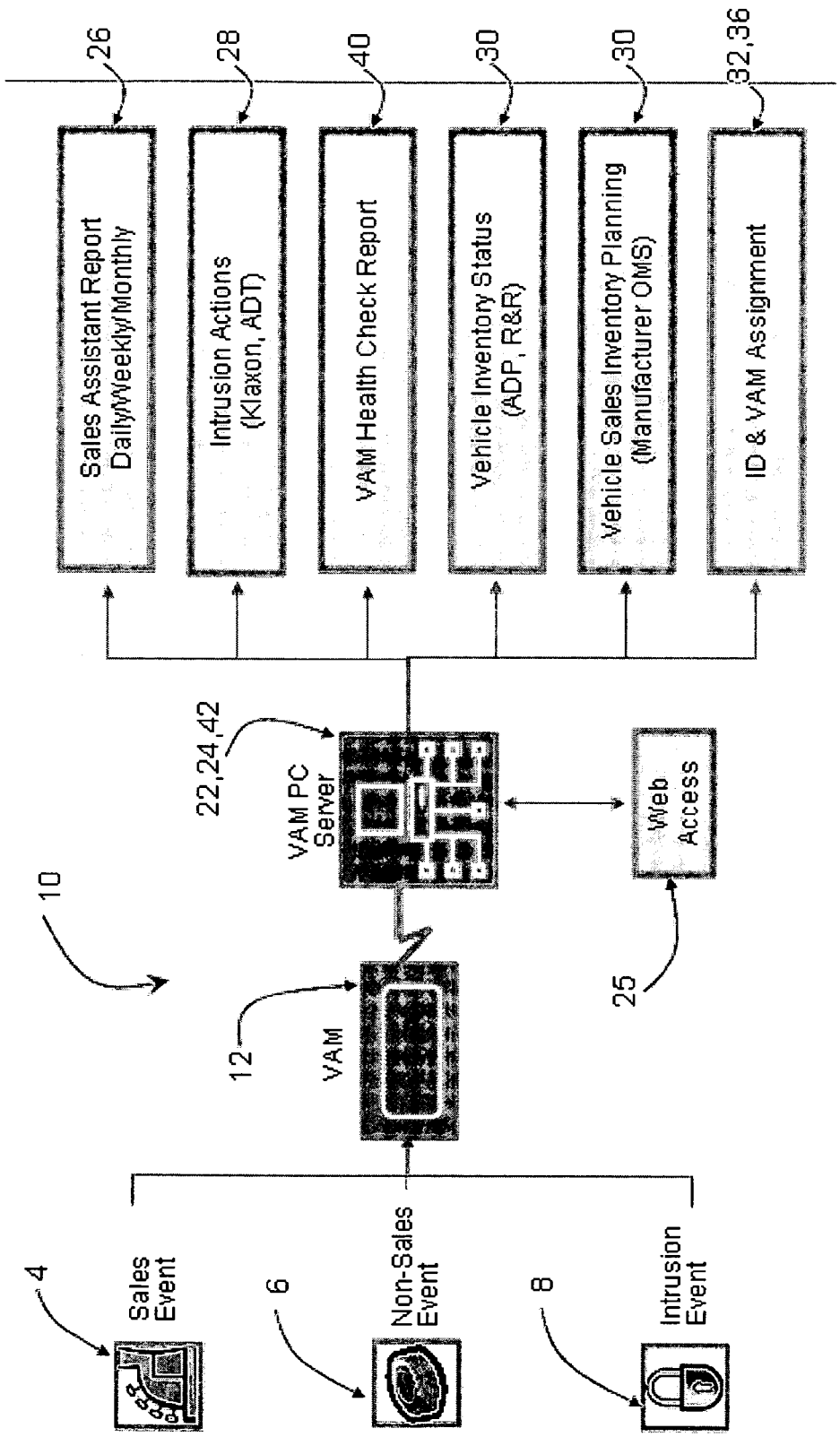
FIG. 1 shows a diagram of the basic functional elements of the system and apparatus of the present invention.
Figure 2:
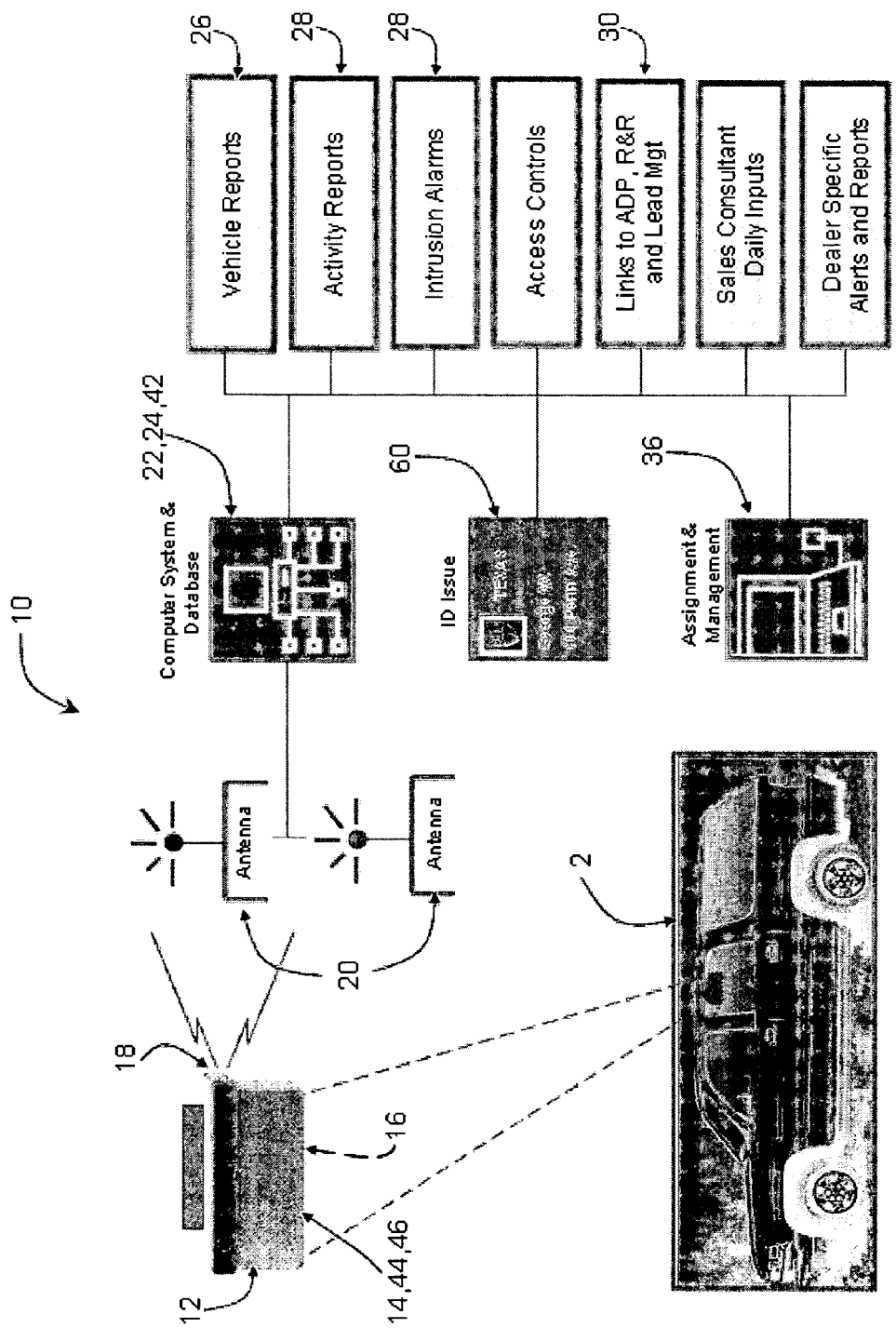
FIG. 2 shows a diagram of the basic physical architecture of the system and apparatus of the present invention.

FIGS. 1 and 2 shows the functional embodiment, and physical interrelations of the vehicle activity monitoring system 10 as applied to optimizing vehicle sales. In basic terms, this system 10 includes vehicle activity modules (VAM) 12, mounted on vehicles 2, which accept data from or indicating various types of events, such as sales events 4, non-sales events 6 and intrusion events 8. The VAM 12 includes a lock box or key container 14 including keys sets 16 and a transmitter or WI-Fi wireless link 18 which relays various information to one or more antennae 20 connected to a central computer 22 containing a database 24. The data in this database 24 is then capable of being sorted and queried to produce various reports 26 or to initiate alarms 28 or to provide information for manufacturing orders 30.

FIG. 2 shows the physical embodiment of the invention 10 as applied to a dealer location. Every vehicle 2 in on the dealer lot will have a uniquely identified VAM Every VAM 12 is assigned by vehicle VIN number and stock number, when first introduced into sales inventory. The assigned VAM 12 will stay with the assigned vehicle 2 until the vehicle 2 is sold or otherwise removed from inventory. The VAM 12 will communicate to the database 24 on a PC 22 inside the dealer facility through standard Wi-Fi high gain antennas 20 located typically on the roof of the dealership. These antennas 20 will be installed in sufficient locations so that the VAMs 12 will be able to connect from any open space on the dealer lot. The antennas 20 will typically be wired directly to the central PC 22 except where a remote lot is part of the dealer system. In this case, some relay technology will be added to get the signal to the central PC 22. This PC 22 will serve as the collector of the event data and deposit this into a database 24 residing on the PC 22. The PC system 22 will also be the processing center for all VAM data collection and for outputs that include but are not restricted to, event reports 26, ID issue 60, authorization control and VAM assignments 36 to each vehicle 2.

VAM status reporting is also provided for along with the daily inventory of all vehicles so that rechargeable battery packs 38 (see FIG. 5 below) does not drop below a minimum threshold before being recharged. This reporting is called the VAM health check 40 (FIG. 1) and in addition to the battery status, will also signal any error problems detected by the VAM self contained diagnosis software 42. Web access 25 is also provided through which individuals can check status, access reports or be alerted to alarms or key events.

Figure 3:
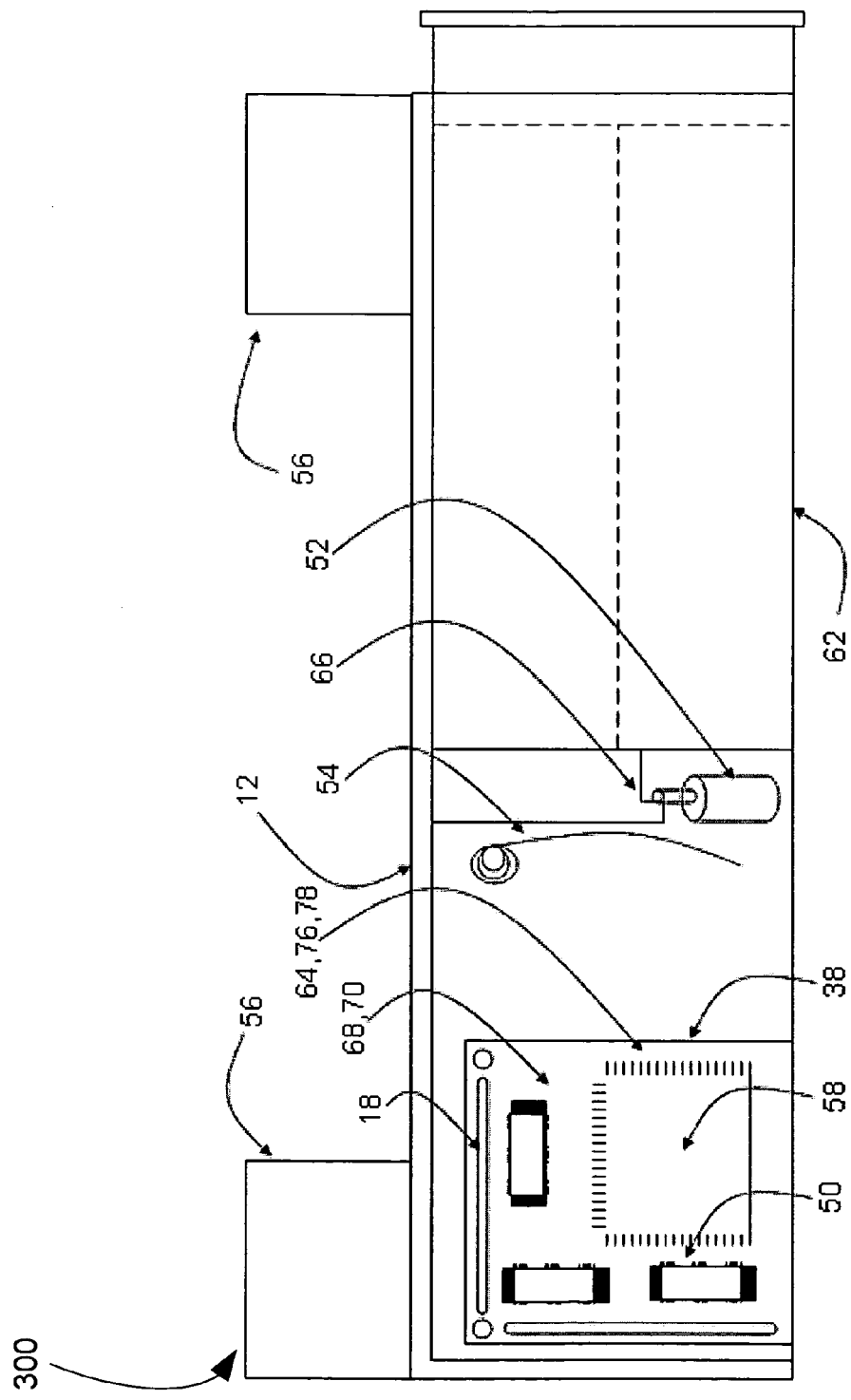
FIG. 3 shows a diagram of the basic electronic components of the vehicle activity module of the present invention.
Figure 5:
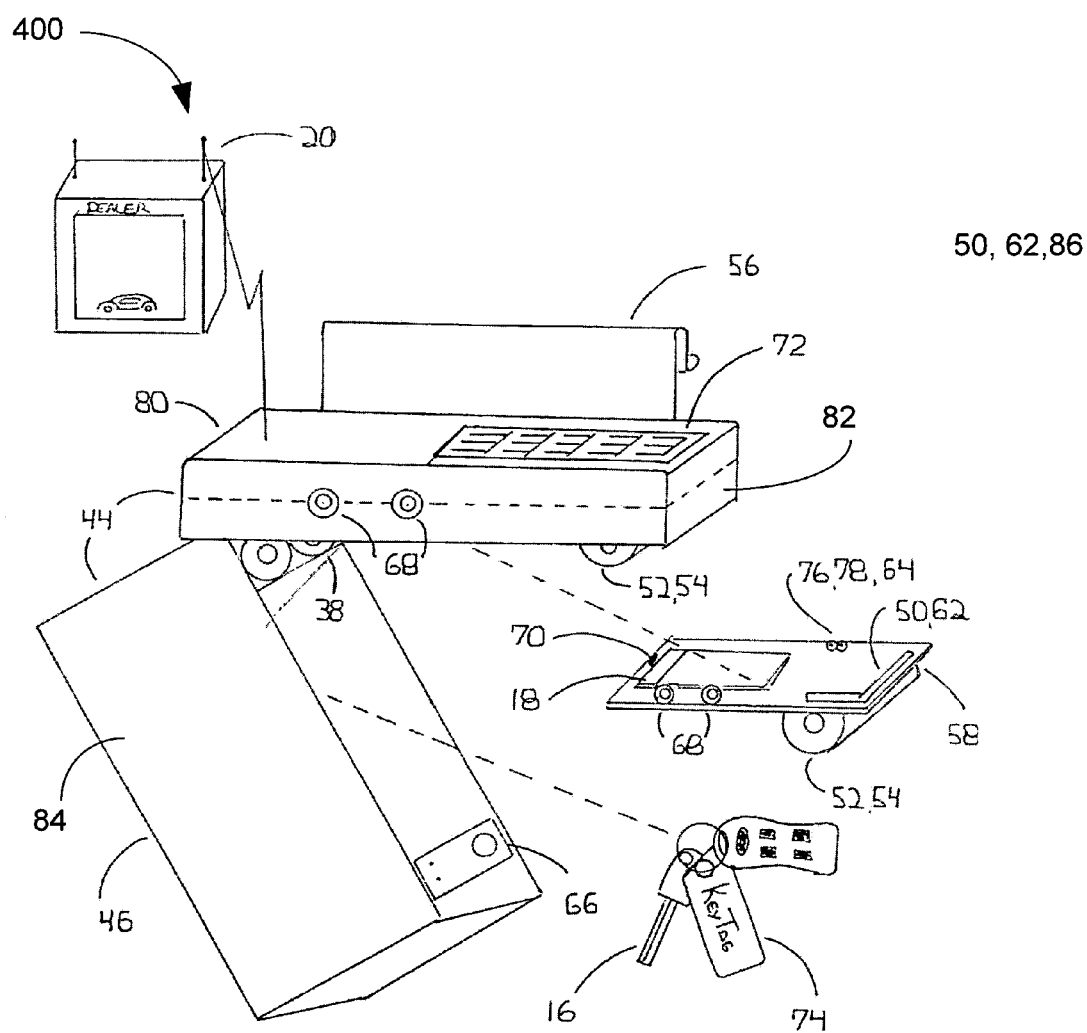
FIG. 5 shows a perspective view of a vehicle activity module of the present invention in open position.
Figure 6:
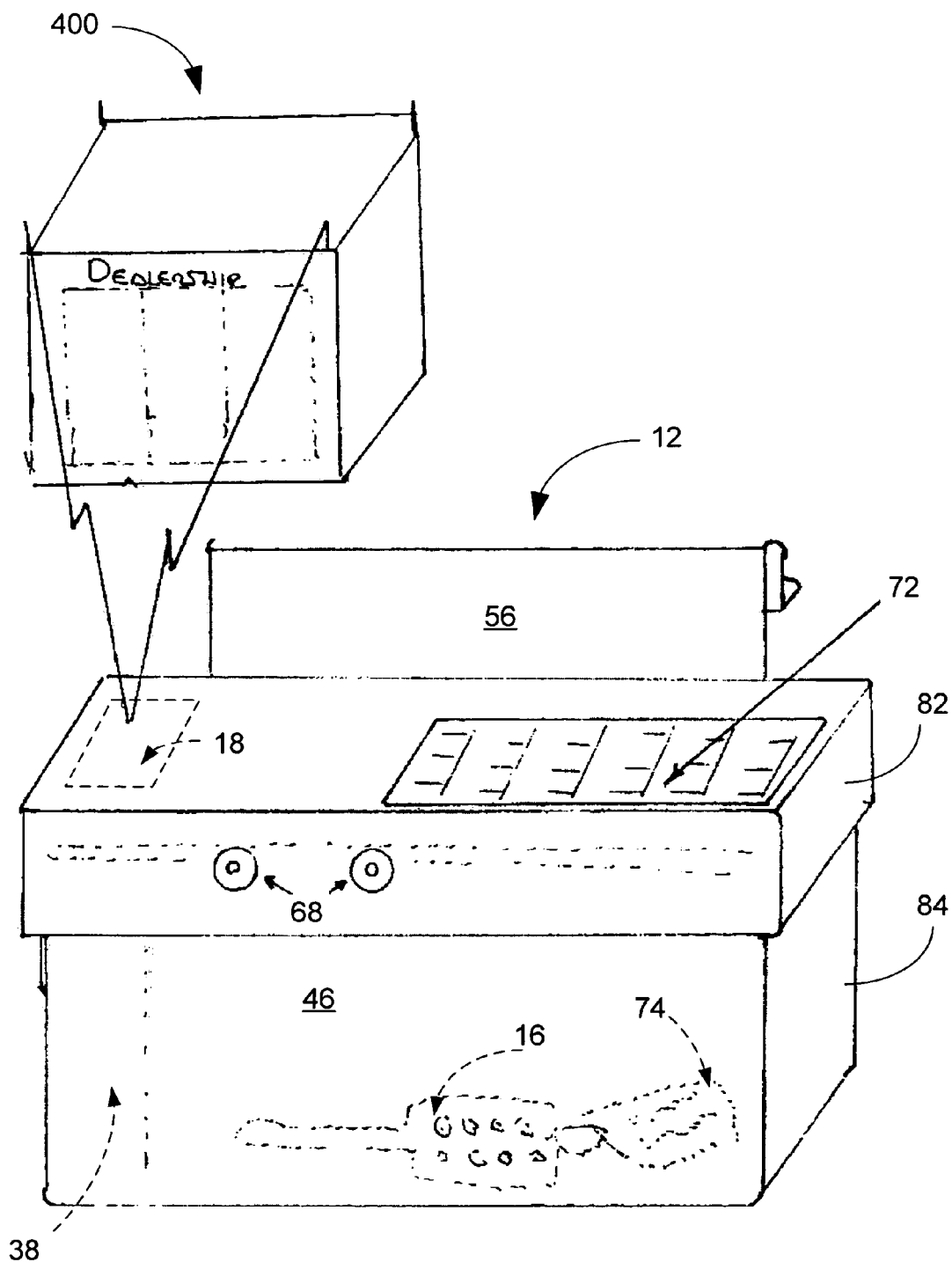
FIG. 6 shows a perspective view of a vehicle activity module of the present invention in open position.

FIGS. 3 and 4A and B show a first embodiment 300 of the present invention, in which the key container 46 is configured as a sliding drawer with a magnetic card reader for reading ID cards. FIGS. 5 and 6 shows a second embodiment 400, in which the key container 46 is configured as a box with a hinged top, which has been equipped with an RFID reader which can read both a personal ID card 60 and the ID tag 74 which is attached to the vehicle key at any time in which the key container 46 is opened or closed. Where elements are configured similarly, or perform the same function, they will be designated by the same element number in both embodiments, so that for instance, a card reader 50 will refer to both a magnetic card reader and an RFID reader.

FIGS. 3-6 show the physical internals of the VAM 12. The VAM 12 consists of three major components; the VAM housing 44, the key container module 46, and the systems board electronics module 58. Included in the VAM housing 44 is an ID reader 50, which could be a magnetic strip reader or preferably an RFID reader, a release solenoid 52 and a release spring system 54, and the stainless steel window straps 56, which will be recessed into the back and under the body of the VAM housing 44. The VAM housing 44 material is preferably high impact injection molded PVC with an metal or synthetic key chamber. The use of a non-metal material for the VAM top cover of the housing 44 allows the Wi-Fi signal to reach the antenna 20 in either direction, through the car or away from the vehicle, making the VAM 12 more difficult to defeat. The weight and shape of each VAM makes it easy to open and to physically handle. The third component of the VAM 12 is the electronics module 48 containing the electronics circuit board 58 which is mounted in a panel that can be removed for repair by a VAM repair depot. This circuit board 58 is custom manufactured to high quality standards using all standard off the shelf cost effective components.

Referring now also to FIGS. 1 and 2, with the reading of a valid ID card 60, the ID 60 is validated in the PC database 24 in the dealership, through the WI-Fi wireless link 18. This validation process typically would take a few seconds. Once the validation is received, the key container 46 is released so that the sales consultant or other users can remove the key 16 for access to the vehicle 2. In a sales event 4, the interested customer will be given immediate access to the vehicle 2. If the customer decides to test drive the vehicle 2, the sales consultant would simply check the customers drivers license and then take customer off of the lot in the vehicle. When the vehicle 2 exits the lot, the Wi-Fi system 18 records that this vehicle is now absent but is still in an open sales event. The VAM 12 then records this as a demo drive attributed to the respective sales consultant, and records the elapsed time the vehicle 2 is out off the lot Upon completion of any sales event 4, the key 16 will be replaced in the VAM 12 and the key container 46 closed. All the relevant data is added to the sales event for subsequent management follow-up and sales reporting.

Any open event must be terminated by the key replacement as verified by a key presence sensor 62 and container closure sensor 64.

FIG. 4A shows the VAM key container 46 in the fully open position and also a view of the VAM 12 from the right side when closed in FIG. 4B.

FIGS. 5 and 6 show the VAM 12, with the key container 46 in open position and closed positions, respectively. The VAM 44 housing consists of a top cover 82 which also houses the electronic system board 58 and the housing bottom 84 which includes the key container 46. The latch mechanism 66 is visible in FIG. 5, along with a set of LEDs 68 which indicate status. The wireless transmitter 18 is located on the circuit board and is generally in the top front left area just under the cover 82. The circuit board 58 is shown in dashed lines. An intrusion sensor 70 is also located on the circuit board 58 as shown. The battery pack 38 is located below the circuit board 58 in the left end of the key chamber 46. In order to help keep the rechargeable battery pack 38 fully charged, a high efficiency solar panel 72 is permanently installed in the top 82 which provides the batteries 38 with a trickle charge during daylight hours. The electronic system board 58 is a single circuit board located horizontally inside the top 82 of the VAM 12. In FIG. 5, the system board 58 is directly behind the LEDs 68, and extends almost the full length and width of the top cover 82. The key presence sensor 62 and ID sensor 50 antenna consists of 2 loops of wire that run around the outside edge of the system board 58.

An important feature of the system is the Key Tag function. Each vehicle key set 16 has a small black RFID key ID tag 74 attached by a metal wire loop. This key ID tag 74 is a "smart tag" that transmits a unique ID code in the presence the correct sensor. These key ID tags 74 will be "read" electronically each time the VAM 12 is accessed and again when closed by the key presence sensor 62. The purpose of this key ID tag 74 is to identify that upon each access there is a key set 16 in the VAM 12 and that it is the correct key set 16.

The key ID tag 74 is typically assigned to a key set 16 and a VAM 12 by an administrative person at the time a vehicle 2 is placed in inventory. This is accomplished quickly since the vehicle descriptions such as model, color and VIN number are automatically loaded into the server 22 each night from the dealer management system. The key tag ID 74 is sensed or read by a key presence sensor 62 on the main system board 58 in each VAM 12, so long as the tag 74 is in the VAM key container 46. The key presence sensor 62 is a custom designed circuit that is built to read the key tag 74 and also the user ID card 60, with one common circuit, and to recognize and read both the key tag 74 and the ID card 60 at the same time, thus it is appropriate to refer to the key tag/ID sensor 86. The sensor circuit 62 is built into and encircles the electronics on the single systems board 58. It sits over and only a few inches above the key tag 74 when in place in the VAM 12.

Another important feature is the key chamber position switches 76 function. There are two micro switches 78 mounted on the system board 58 to detect whether the key chamber 46 is now open or shut, and whether there is an immediate request to access the VAM 12 or to close an event since the keys 16 have just returned. The two key chamber position switches 78 are located inside the VAM 12 and at the back of the VAM 12. The system board 58 is mounted horizontally inside an injection molded top section 80. When viewing a VAM 12 on a drivers side window, the switches 78 are mounted underneath and at the back of the system board 58 such that when the key chamber 46 is closed, it contacts these two switches 78 at the point at which the solenoid latch 66 engages. One switch serves as a 'key chamber closed' indicator and the second serves as a request to wake-up and/or open indicator.

The VAM 12 is also equipped with an intrusion sensor 70. The function of the intrusion sensor 70 is to send an alert to dealership security that is based on the level and type of disturbance. This sensor 70 or "disturbance switch" was designed initially for automotive and military defense applications. The intrusion sensor 70 is a small inconspicuous device located on the system board 58 alongside other electronic components. This intrusion sensor 70 is calibrated to detect random disturbances in a horizontal plane and also detects abnormal tilt motion. Each dealership will be able to choose the level of sensitivity that they want from their VAM 12 units. This is important since some geographic areas have more theft and vandalism problems and lack of detection is a driving problem. The alerts are disabled when there is a valid event underway. Also, the RED LED's 68 would typically be used as a visual warning by blinking brightly from time to time and also will react when disturbed during the times the dealership is open. After hours, the LED's also acts as a deterrent by all VAM's randomly flashing their RED LED's every few minutes. Any detected intrusion would send a watch alert or a full alert to the dealer's security service depending on the severity of the disturbance. In this way, some heavy weather caused disturbances can be differentiated from an actual intrusion or attempted intrusion.

In addition to security alarms activated by disturbances, each VAM 12 asks for attention when needed including waking up at programmed (and controllable) intervals such as every 30 minutes during business hours and every 5 minutes at night so we have an AWOL/MIA fall back to generate an alert.

By applying the information deposited in the database 24 from the VAMs 12 along with the dealers experience, an objective of continuously increasing inventory turns and profitability is supported by the extension recorded and organized event data.

Figure 7:
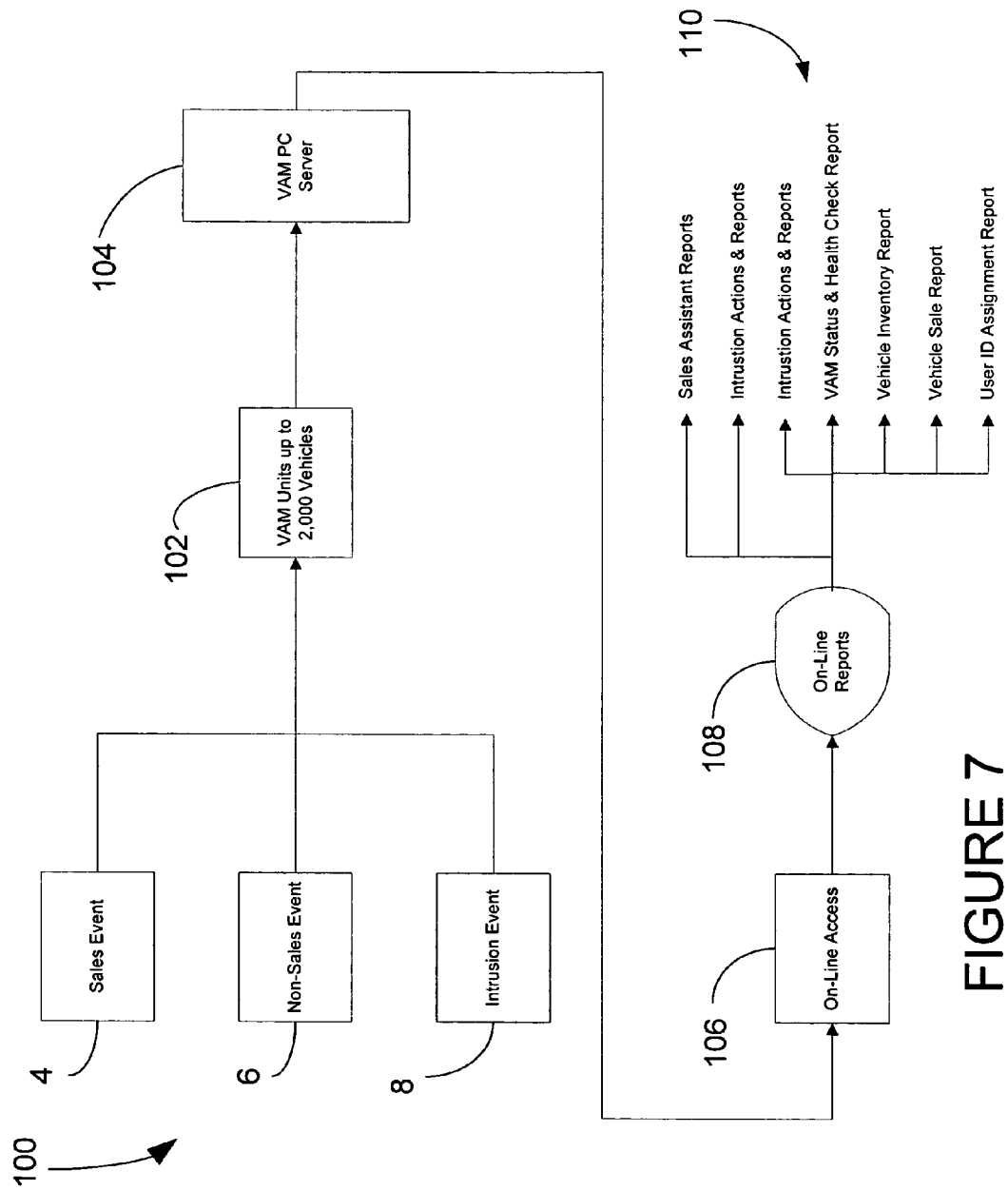
FIG. 7 illustrates a flow chart showing the overall functional view of the operation of the system and apparatus of the present invention.

As mentioned above, there will be at least three types of events enabled by the present system 10. Flow charts are shown for each of these three event types in FIGS. 8-10, as well as for a general functional view 100 of event detection in FIG. 7. FIGS. 1-6 are also referenced for some physical elements discussed in conjunction with the flowcharts.

Generally, the three events 4, 6, and 8 are detected by any of the VAM units 12 which are included in up to 2,000 vehicles 102. This information is relayed to the VAM PC server 104, which is equipped with on-line access 106. On-line requests can be used to generate on-line reports 108 such as sales assistant reports, intrusion actions and reports, VAM status and health checks, vehicle inventories, sales and user ID assignment reports, noted as a group as 110.

The database 24 has been designed for maximum flexibility with the supplied screens and for any custom reports the dealer wants to use. Reports can be sent on a scheduled basis by email, and can also be accesses on-line by authorized individuals. Reports are delivered in MS Excel format.

Reports such as the "missing vehicle" report will quickly find all vehicles not properly checked out, missing or not available for sale. Any detected disturbance of the lockbox will send out an alert/alarm to a security company/dealer general manager. This feature will likely be used as a visual disturbance warning (RED LED) in the day and send alerts by internet and/or cell phone message. By example: Intrusion alert: HIGH for Red Corvette, north lot VIN123456789, and ON STAR equipped.

Figure 8:
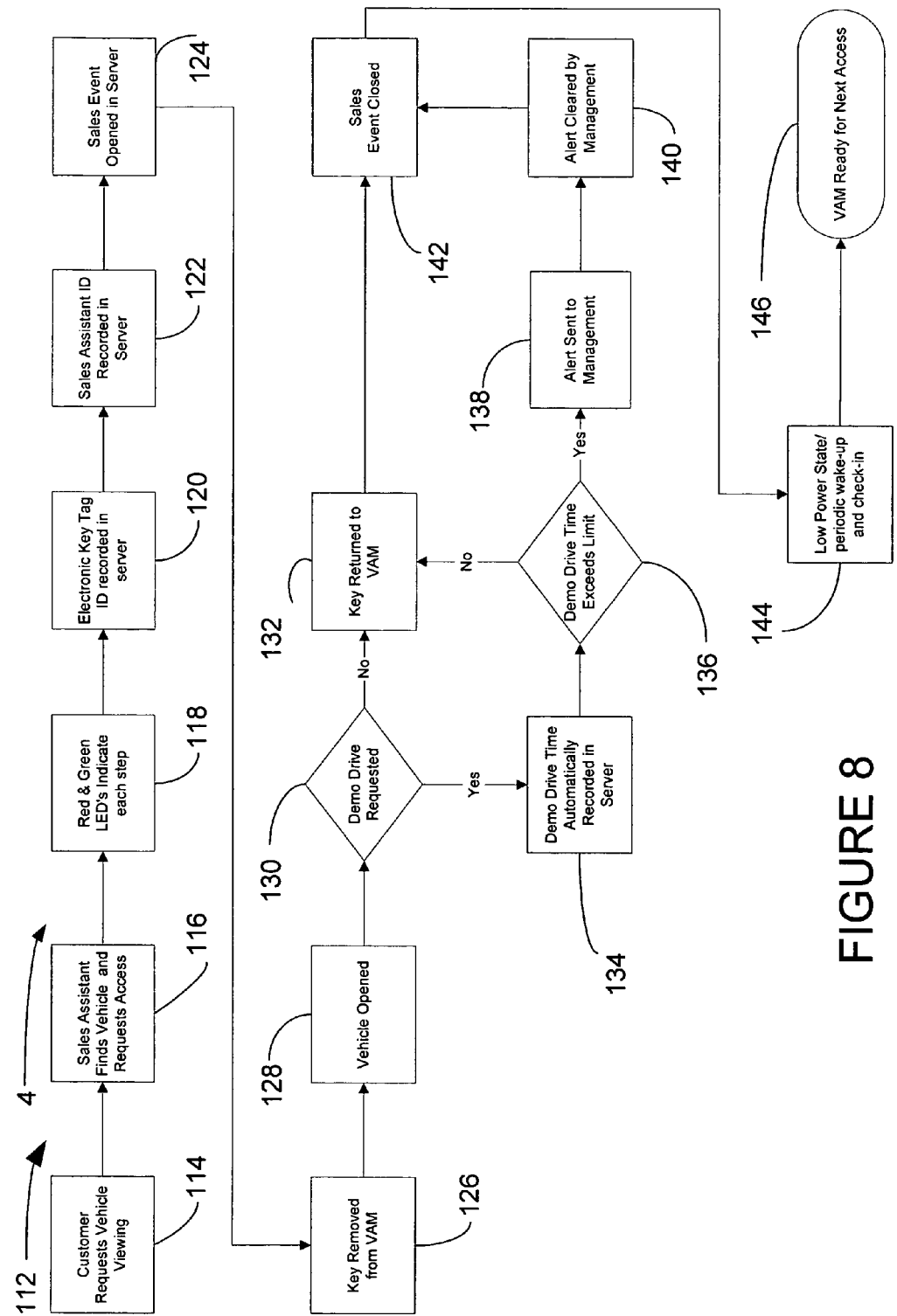
FIG. 8 illustrates a flow chart showing the operation of the system and apparatus of the present invention during a non-sales event.

FIG. 8 shows a flow chart 112 for a sales event 4. A sales event 4 is initiated when a customer requests a viewing 114. The Sales Assistant is assumed to have been issued an appropriate ID card 60. He finds the vehicle 2 and requests access by scanning his ID card 60 through the reader 116. Red and green LEDs 68 indicate each step of the process 118, and the electronic key tag ID 74 is read and recorded in the central computer 120, along with the Sales Assistant's ID 122. A sales event 4 is opened in the server 124, and access is granted to the vehicle 2 as the key 16 is removed for the key container 126. The vehicle is opened 128 for inspection and the customer is asked whether she wants a test drive 130. If the answer is no, the key is returned to the key container 132 and the sales event is closed 142. If the answer is yes, the demo drive time is automatically recorded in the server 134. A determination whether the drive time limit exceeds a permitted limit 136. If not, the key is returned to the key container 132 and the sales event is closed 142. If the limit is exceeded, an alert is sent to management 138, which must be cleared 140 before the sales event is closed 142. If the alert is not cleared, an alarm may be sounded or security or police agencies notified.

The VAM 12 is programmed to periodically wake-up and check in 144 at programmed (and controllable) intervals such as every 30 minutes during business hours and every 5 minutes at night so there is an AWOL/MIA fall back to generate an alert. The VAM is then ready for the next access 146.

Figure 9:
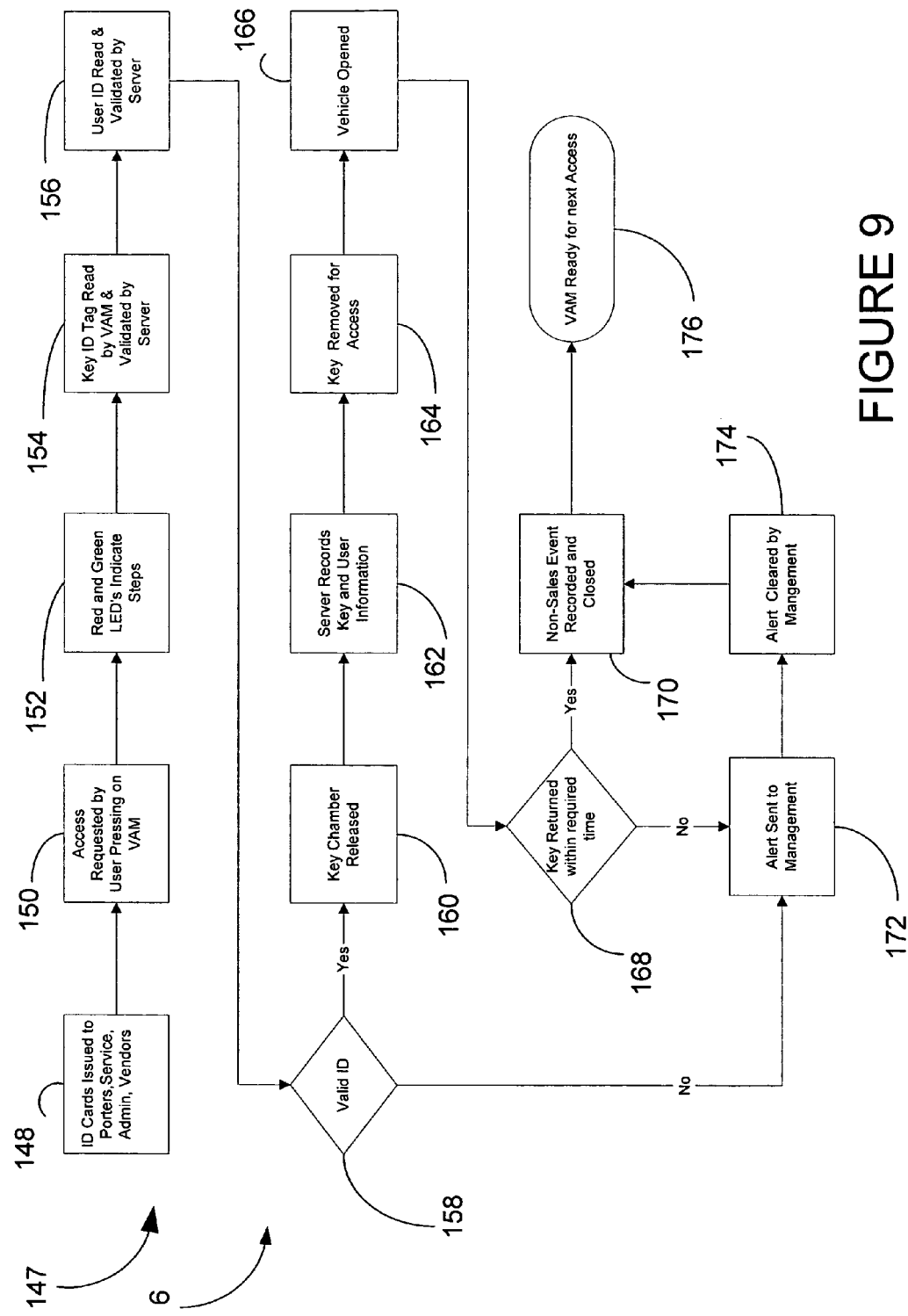
FIG. 9 illustrates a flow chart showing the operation of the system and apparatus of the present invention during a sales event.

FIG. 9 shows a flow chart 147 for non-sales events 6. ID cards 60 are issued to porters, service personnel, administrators and vendors 148 who might have need for access to the vehicles. Access is requested by one of these personnel by pressing on the VAM 150 key container 46 chamber with a slight upward motion on the right side. This activates the 'request for wake-up' and service switch. LEDs 68 again indicate steps 152. The key ID tag 74 is read by the VAM 12 and validated by the server 154. The user ID 60 is read and validated by the server 156. If the ID is valid 158, the key chamber 46 is now available to open with a second slight upward motion again on the right end. This will now activate the unlocking solenoid 52 and the key chamber 46 will swing down and expose the vehicle key set 160 The server records Key and User ID information 162, the key 16 is removed 164 from the key container 46, and the vehicle 2 is opened 166. The time that the vehicle is opened is recorded and later it is determined if the key is not returned within the time limit designated by the dealer as the 'maximum demo/ key missing time' 168. If "yes", the key is returned to the key container, and the non-sales event is recorded and closed 170. If the limit is exceeded, an alert is sent to management 172, which must be cleared 174 before the non-sales event is recorded and closed 170. The VAM is then ready for the next access 176. If the alert is not cleared, an alarm may be sounded or security or police agencies notified.

Figure 10:
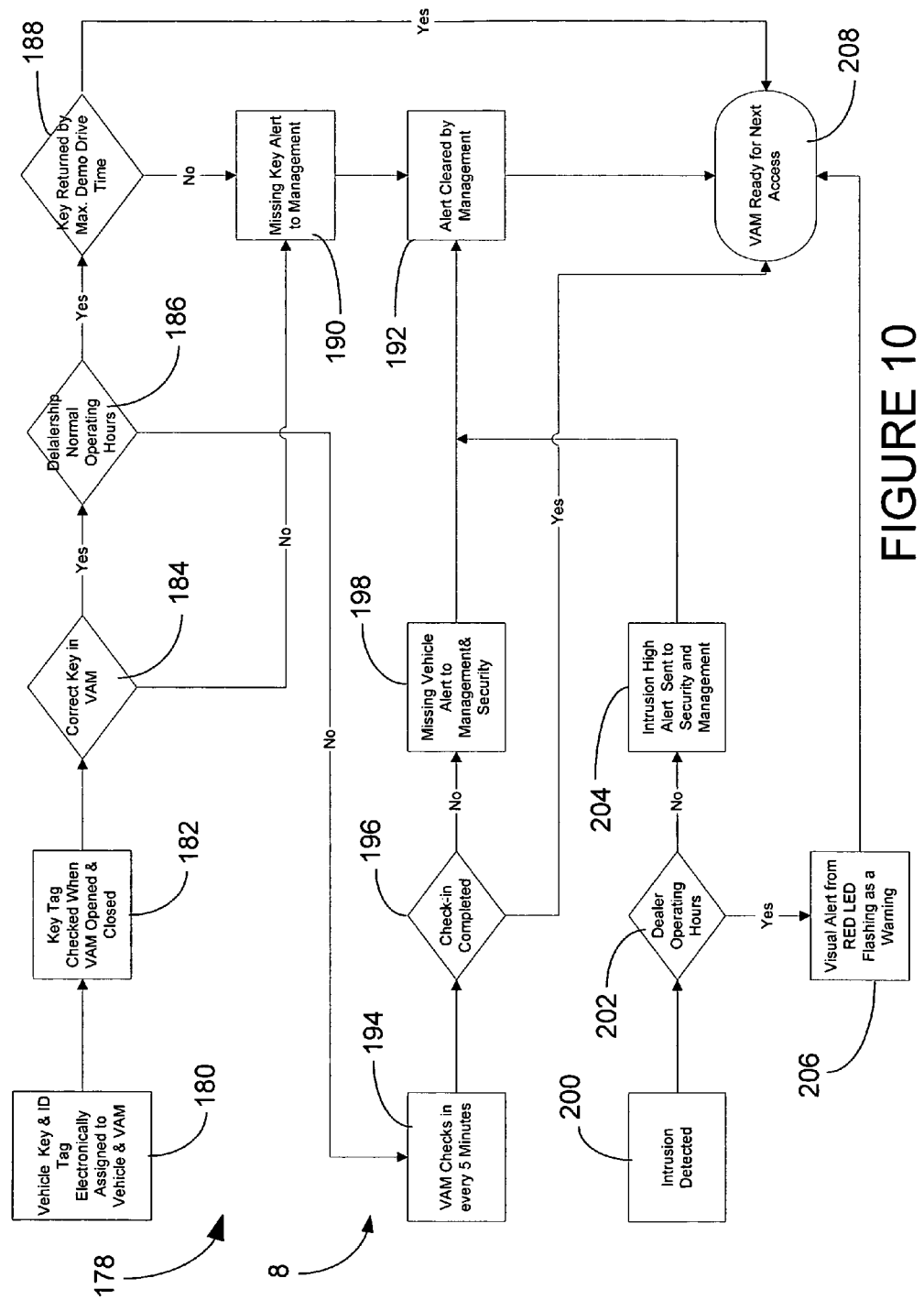
FIG. 10 illustrates a flow chart showing the operation of the system and apparatus of the present invention during an intrusion event.

FIG. 10 shows a flow chart 178 for an intrusion event 8. Vehicle key 16 and key tags 74 are electronically assigned to the vehicle 2 and VAM 180. The key tag 74 is checked when the VAM 12 is opened 182, and it is determined whether it is the correct key 184. If "yes", a second determination is made by the server 22 whether the event takes places during normal operating hours 186. If "yes" again, the time that the vehicle 2 is opened is recorded and determined if returned within the maximum demo drive time limit 188. If "yes", the VAM 12 is ready for the next access 208. If the limit is exceeded, then a missing key alert is sent to the management 190, which must be cleared 192 before the VAM is then ready for the next access 208. If the alert is not cleared, an alarm may be sounded or security or police agencies notified. If the key is not correct, then a missing key alert is sent to the management 190, which must then be cleared 192 before the VAM is ready for the next access 208.

If the key is correct 184, but it is after hours for the dealership 186, the VAM 12 checks in every 5 minutes 194. If the check in is completed 196, the VAM 12 is ready for the next access 208. If the check-in is not completed 196, a missing vehicle alert is sent to management and security 198.

The VAM 12 is equipped with an intrusion sensor 70 which detects disturbance of the module. If an intrusion is detected 200, there is a determination whether it takes place during normal operating hours 202. If yes, a visual alert from the Red LED flashes as a warning 206 and the VAM 12 is ready for the next access 208. Optionally, a Dealer can designate that an alarm be sent even during the day but it is unlikely to be used, since most thefts occur at night. If it is after normal dealer operating hours 202, an Intrusion High Alert is sent to security and management 204, which must be cleared 192 before the VAM is then ready for the next access 208.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

INDUSTRIAL APPLICABILITY

The present Vehicle Activity Module system 10 is well suited for application in providing security, tracking and managerial information.

Car dealers were consulted as to what features were desirable to improve security and inventory control and their responses were used as a basis for this invention. These features included the need for use on both used and new vehicles to provide information on who, when, how long and why they were accessed. They wanted the key available on the car, wanted the system to be intuitive, react in real time, have tamper controls, and able to provide the status on demand for inventory, key and theft control by providing basic reports. A sensor for the key container was desired, and the system should require low maintenance.

Due to the recent advancements in products for wireless communications, all weather RFID card readers, and solar assisted battery technology, the components are available from off the shelf making this invention possible at a reasonable cost. Each time a sales consultant opens a vehicle for customer showing, a sales event will be launched when the sales consultant's ID is validated after passed through the VAM reader. If the ID is approved the key container will immediately be accessible. This event will continue to be open until terminated by replacing the key and closing the VAM key container. A system alert will be generated if closure is not achieved in a reasonable period of time (as fixed by dealer policy).

The second event will be a non-sales and non intrusion event such as vehicle cleaning, moving the vehicle to a different location, and the vehicle being taken out of inventory by sale, trade, auction, or other assignment.

Third, will be any event that is interpreted by the internal VAM sensors and tampering, referred to here as an intrusion event. Sensitivity to normal events will not generate an alarm. However, the shock sensor in the VAM can be turned up in off hours by the central system, to attack any minor tampering in off hours. Web access will be provided for authorized persons to remotely access reports, inventory data, system status, VAM status, software support, software enhancements, and authorized third party access. Intrusion detection and alerting will be integrated with each VAM. If there in an unauthorized attempt to remove or tamper with the VAM when the dealership is closed, the VAM sensors will detect this tampering and signal, brightly flash the red led and at the same time an alarm will be sent immediately go to a dealer designated security service and/or to dealer management If for any reason the VAM is unable to communicate the alarm to the VAM System, a missing vehicle alarm will be sent out 5 minutes later when the VAM fails to check-in.

In addition, and with dealer consent, demand and fulfillment information may be aggregated and made available to the vehicle manufacturers. This data could be used to improve the production planning and possibly return on assets by the manufacturers by improving the accuracy of matching vehicle production to the most current demand, with the possibility of benefiting all parties while protecting the best interest of the dealers.

This invention is the first real-time data authorization process to capture the all inventoried dealer vehicle access events "on the spot" and to therefore insure access accountability. Key elements of this invention are as follows;

1. Wireless device that is hooked over the window of each vehicle in inventory. This device is termed the "Vehicle Activity Module" or VAM. The VAM will utilize a personalized magnetic card and a reader similar to a bankcard and each authorized cardholder will have a unique identifier.

2. Antennas typically will be located on the dealership roof and provide a clear path to communicate with all Vehicle Activity Modules. Many VAM can communicate with a single antenna simultaneously. A specific approach is to use world wide standard Wi-Fi or 802.11 technology configured for maximum connection speed. VAM access to the antennas does not have to be line of site as Wi-Fi is designed to be used in buildings as well and will penetrate walls and windows. Each antenna will relay the information to a central computer typically located in the dealership phone and network equipment room.

3. The dealer "VAM" database will preferably consist of a standard PC with a Microsoft relational database, which will provide validation in real-time, prior to any authorized vehicle access. With a validated card the VAM will present the vehicle key and record this event.

4. When the vehicle activity is completed (within a reasonable period of time), the key will be returned to the VAM and the event terminated by closure of the VAM with the vehicle key replaced in the specially designed key container. Each step will be recorded in the data base and the VAM is ready for the next access.

5. When each Authorized Access cardholder arrives for the day they will quickly "activate" their ID at a station near the showroom. This will help insure that the individual is present at that time and in possession of their assigned ID card. This notification event is required to allow any specific card to be a valid for that day or until that specific card is suspended.

6. From time to time during the day and in between sales events each Sales Consultants can easily add comments and customer contact details to the activity report at any dealership.

7. New or emergency cards can be issued as required by the appropriate person with access to the authorization application.

8. There will be three standard reports generated by the VAM System that can get scheduled or generated as required.
   Sales Activity Report summary by Sales Consultant
   Vehicle Activity Report with alerts for action based on individual dealer policy
   VAM Status report for maintenance actions 9. There will be one or more additional applications available to each dealer, which will provide a managerial, user friendly "dash board" for past vehicle sales analysis and future inventory planning. The activity information history contained in the data base (actual sales by vehicle group, by margin, by feature group, by price, by color, promotions, competitive moves, and other factors, as defined by each dealer), will be used for projecting inventory replenishment requirements.
   Pre-Installation Planning Required
   Detailed Site Survey to create a commercial level custom wireless infrastructure blueprint.
   Installation approved, directed and tested.
   Installation includes computer system/access points and antennas (typical installation will have 4 to 10 antennas connected to one server).
   Installation and Vehicle Data Loading
   Detailed Vehicle Data is automatically loaded nightly on the VAM server from the dealers DMS (dealer management system typically ADP or Reynolds& Reynolds).

Installation of the VAM System is a few administrative set up screens.

ID Cards Created at the Dealership

Individual ID cards are issued to sales, management, service, lot porters, and special vendors.

The system provides tracks a daily pass ID when needed so that there is no need to borrow.

The general manager will keep some master ID cards in case an emergency. A master card gives immediately opens any VAM lockbox.

Sales Event

Sales person activates VAM and obtains the vehicle key.

Shows vehicle to customer.

Demo Drive is captured if applicable.

Key is replaced and event is closed.

Daily comments into any and every sales event can easily be quickly (pre-defined check boxes plus comment block) be captured.

Non Sales Event

Vehicles are accessed constantly for non-sales reasons.

There are 2× daily accesses for non-sales events.

Vehicles can get stuck in vendor locations where there are service/repair needs. The system highlights vehicles that are in inventory and have no/few sales events The core of the VAM System is the lockbox integrated with a custom designed wireless infrastructure (every dealership is different) and the management software to make key access and accountability dealership super simple.

The present invention uses a system where the VAM is in a light sleep mode with the ability to react in milliseconds to any interrupt (disturbance/request for access). There is no concept of a roll call but each VAM asks for attention when needed, including waking up at programmed (and controllable) intervals such as every 30 minutes during business hours and every 5 minutes at night so that there is an AWOL/MIA fall back to generate an alert. This avoids the problems involved in using a pulse generator which must constantly listen for a "roll call" and thus expends battery power quickly.

VAM Access Control to Keys Sets

Access to keys granted or denied in real time.

Access locked out after hours except for master cards.

All users identified and tracked.

Access key is electronic (RFID) and encrypted to avoid copying.

Each key set also has an RFID tag for tracking with each access and return. Power Source-always available and independent power sources are required to secure the car.

Regulated power to keep the electronics operational.

Renewable energy source with daily solar re-charge of the battery pack.

Battery strength reported every few minutes for advanced notice if a failing battery.

Battery packs are easily replaceable by the dealer.

Real Time Wireless Tampering Alerts

Vehicle specific (by vehicle description & VIN) immediately reported to security surveillance center.

Same information can be also be sent immediately to cell phone(s) as an urgent message.

Same information is also sent by email.

VAM units not reporting in at regular (5 minute) time interval will generate an immediate alarm as a fail safe.

For the above, and other, reasons, it is expected that the vehicle activity module system of the present invention will have widespread industrial applicability. Therefore, it is expected that the commercial utility of the present invention will be extensive and long lasting.

What is claimed is:

1. A system for maintaining security and gathering data for a plurality of vehicles comprising:

a vehicle activity module for each of said vehicles, said vehicle activity module including a wireless transmitter, sensors, a key container and a mounting device to mount the vehicle activity module to each of said vehicles;

a central computer having a database for data storage, said central computer being in wireless communication with each of said vehicle activity modules;

key ID tags, which are attached to vehicle keys;

and personal ID cards which are issued to sales, maintenance and service personnel;

wherein: information read from personal ID cards by said sensors is transmitted to said central computer for authorization of access and recording of access activity;

and information read from key ID tags attached to keys by said sensors is transmitted to said central computer for storage and analysis.

2. The system of claim 1, wherein:

said vehicle activity modules operate in sleep mode until awakened by an event to report activity; and said event is chosen from a group of events consisting of sales events, non-sales events and intrusion events.

3. The system of claim 2, wherein:

said key ID tag information includes the presence or absence of said key ID tags, and therefore of said keys, in said vehicle activity modules.

4. The system of claim 1, wherein:

said vehicle activity modules operates in sleep mode until awakened at periodic programmed intervals to report on status.

5. The system of claim 4, wherein:

said status which is reported includes a health check of said vehicle activity modules.

6. The system of claim 1, further comprising:

an intrusion sensor.

7. The system of claim 1, wherein:

said information from said ID cards and key ID tags is used to generate alerts and theft alarms.

8. The system of claim 1, wherein:

said information are from said ID cards and key ID tags is used to generate reports for inventory and administrative planning.

9. The system of claim 1, wherein:

said information are from said ID cards and key ID tags is used to request access to vehicles.

10. The system of claim 1, wherein:

said sensors include an ID reader.

11. The system of claim 10, wherein:

said ID reader is an RFID reader.

12. The system of claim 10, wherein:

said ID reader is key tag/ID reader.

13. A vehicle activity module for maintaining security and data gathering for a plurality of vehicles, to be used in cooperation with a central computer, personal ID cards, and key ID tags attached to vehicle keys, the vehicle activity module comprising:

a housing having a releasable key compartment, said housing being securely mounted to some portion of each said plurality of vehicles;

at least one ID reader by which ID information can be scanned from said personal ID cards and key ID tags;

and a wireless transmitter by which said personal ID card information and key ID tag information can be transmitted to a central computer for storage and analysis.

14. The vehicle activity module of claim 13, wherein;
said key ID tag information includes the presence or absence of said key ID tags, and therefore of said keys, within said vehicle activity module.

15. The vehicle activity module of claim 13, wherein; said vehicle activity modules operates in sleep mode until awakened by an event to report activity.

16. The vehicle activity module of claim 13, further comprising;
an intrusion alarm.

17. The vehicle activity module of claim 13, wherein; said ID reader is a magnetic strip reader.

18. The vehicle activity module of claim 13, wherein; said ID reader is an RFID reader.

19. The vehicle activity module of claim 13, wherein: said ID reader is key tag/ID reader.

20. A method for maintaining security for a plurality of vehicles, to be used in cooperation with a central computer, personal ID cards, and key ID tags attached to vehicle keys, the method comprising:
A) attaching a vehicle activity module to each of said vehicles, said vehicle activity module including a wireless transmitter, sensors and a key container;
B) providing a central computer having a database for data storage, said central computer being in wireless communication with each of said vehicle activity modules;
C) providing that said vehicle activity module remains in sleep mode until awakened;
D) transmitting a wireless signal from said vehicle activity modules to said central computer when awakened; and E) exchanging information between the key ID tags and the sensors.

21. The method for maintaining security of claim 20, wherein:
said vehicle activity module of C) operates in sleep mode until awakened by an event to report activity; and
said event is chosen from a group of events consisting of sales events, non-sales events and intrusion events.

22. The method for maintaining security of claim 20, wherein:
said sensors include at least one item selected from the group consisting of:
a key ID tag sensor, which reads key ID tag information concerning said keys upon opening or closing said key container;
an RFID reader; and
a key tag/ID reader.

23. The method for maintaining security of claim 20, wherein:
said transmission indicates a non-sales event, and a determination of exceeded time limit is determined by sensing the length of time that said key is absent from said key container, and if said time limit is exceeded, one or more alarms may be sounded.

24. The method for maintaining security of claim 20, wherein:
said activity sensors include an intruder sensor, which if activated, cause one or more alarms to be activated.

25. The method for maintaining security of claim 20, wherein:
said transmission of step D) is a regularly timed signal, which if not received by said central computer, cause one or more alarms to be activated.

26. The method for maintaining security of claim 20, wherein:
said transmission of step D) is a signal requesting access which is received by said central computer and which returns an authorization signal which unlocks said key container.

27. The method for maintaining security of claim 20, wherein:
said transmission of step D) activates one or more alarms by the central computer upon receiving said transmission from said vehicle activity module.

28. The method for maintaining security of claim 27, wherein:
said one or more alarms are selected from the group consisting of audio alarms on the grounds, audio alarms on the vehicle, notification to local police or security forces, visual disturbance warning, alerts by internet, cell phone message to personnel, and any combinations thereof.

29. The method for maintaining security of claim 20, wherein:
said transmission of step D) indicates a sales event including a demo drive, and demo drive time is automatically recorded in said central computer, and if a determination is made that the drive time exceeds a permitted limit, one or more alarms are sounded.

30. The method for maintaining security of claim 29, wherein:
said determination of exceeded time limit is determined by sensing the length of time that said key is absent from said key container.

31. The method for maintaining security of claim 20, wherein:
said transmission indicates an intrusion event.

32. The method for maintaining security of claim 30, wherein:
said key tag is checked whether it is the correct key when the key container is opened.

33. The method for maintaining security of claim 32, wherein:
if the key is correct and the event takes places during normal operating hours, the time that the key is missing from the key container is recorded and determined if returned within the maximum demo drive time limit, and if it is not, one or more alarms are activated.

34. The method for maintaining security of claim 32, wherein:
if the key is not correct, one or more alarms are activated.

35. The method for maintaining security of claim 32, wherein:
if the key is correct and the event does not takes places during normal operating hours, the time that the key is missing from the key container and the person ID who last accessed is recorded and transmitted on an accelerated basis, and if not returned within an accelerated time limit, one or more alarms are activated.

36. A method for collecting and analyzing data and on vehicle access for a plurality of vehicles, to be used in cooperation with a central computer, personal ID cards, and key ID tags attached to vehicle keys, and vehicle data, the method comprising:
A) attaching a vehicle activity module to each of said vehicles, said vehicle activity module including a wireless transmitter, activity sensors and a key container;

B) providing a central computer having a database for data storage, said central computer being in wireless communication with each of said vehicle activity modules;

C) providing that said vehicle activity module remains in sleep mode until awakened;

D) transmitting a wireless signal from said vehicle activity modules to said central computer at the time of awakening; and E) exchanging information between the key ID tags and the sensors.

37. The method for collecting and analyzing data of claim 36, wherein:
said vehicle activity module of C) operates in sleep mode until awakened by an event to report activity.

38. The method for collecting and analyzing data of claim 37, wherein:
said event is chosen from a group of events consisting of sales events, non-sales events and intrusion events.

39. The method for collecting and analyzing data of claim 36, wherein:
said vehicle activity module of C) operates in sleep mode until awakened at periodic programmed intervals to report on status information.

40. The method for collecting and analyzing data of claim 36, wherein:
said activity sensors include a key ID tag sensor, which reads key ID tag information concerning said keys upon opening or closing said key container.

41. The method for collecting and analyzing data of claim 36, wherein:
said transmission indicates a sales event, and sales event data including personal ID data and key tag ID data are recorded in said central computer, along with vehicle data, which can be organized into reports for sales and inventory status and planning, sales personnel periodic reports and management projections.

42. The method for collecting and analyzing data of claim 36, wherein:
said transmission indicates a non-sales event, and non-sales event data including personal ID data and key tag ID data are recorded in said central computer, along with vehicle data, which can be organized into reports for personnel periodic reports, inventory planning and management analysis.

43. The method for collecting and analyzing data of claim 36, wherein:
said transmission indicates an intrusion event, and event data are recorded in said central computer, along with vehicle data, which can be organized into reports for security planning and police reports.

44. An inventory management system for a plurality of vehicles comprising:
a plurality of vehicle activity modules, each of which modules includes:
an identification number to uniquely identify the vehicle activity module;
a wireless transmitter;
an activity sensor;
a key container to receive a key;
a key sensor to monitor the presence of a key in the key container; and a mounting device to mount the vehicle activity module to each of said vehicles;
a system computer having a database for data storage, said system computer being in communication with each of the transmitters of said plurality of vehicle activity modules; and a plurality of access ID cards having unique identification numbers, which cards may be used to gain access to a key contained in a vehicle activity module;
wherein the activity sensor reads a unique identification number of one of the plurality of access ID cards and verifies that the access ID card is authorized to have access to the key in the key container, and then permits access to the key container so that the key may be removed to operate a vehicle.

45. The inventory management system of claim 44, further comprising:
an access card activator which is located at a position remote from the plurality of vehicles being monitored and which is coupled in communication with the system computer,
wherein said access card activator reads a unique identification number of one of the plurality of access ID cards, transmits the unique identification number to the system computer which checks the database to determine if the unique identification number is authorized for use, and updates the database to indicate that the unique identification number is activated for a predetermined period of time.

46. The inventory management system of claim 44, wherein said key sensor is embedded within said key.

47. The inventory management system of claim 44, wherein a predetermined vehicle activity module is attached to a predetermined one of a plurality of vehicles, said system further comprising:
a second key sensor, which second key sensor determines whether a key that is placed in the key container of the predetermined vehicle activity module is a key that is designed to operate the vehicle to which the predetermined vehicle activity module is attached, and wherein the system computer utilizes the database to track the identity of keys that are placed in at least one vehicle activity module.

48. The inventory management system of claim 47, further comprising:
a plurality of key tags, each of which is configured to attach to a vehicle key, wherein the key tag has a unique key tag identification number which is used to identify the key to which it is attached;
wherein the second key sensor detects a unique key tag identification number to determine whether the key to which one of the plurality of key tags is attached is a key that is designed to operate the vehicle.

49. The inventory management system of claim 44, further comprising:
an alarm coupled to the activity sensor, wherein the alarm is activated whenever the activity sensor detects an unauthorized intrusion into one of the plurality of vehicle activity modules.

50. The inventory management system of claim 49, further comprising a user interface program receives input from a user, said input including a vehicle description, and said interface program generating a report to the user which identifies a location where a vehicle matching the input description may be found.

51. The inventory management system of claim 49, wherein the key sensor is configured to detect the return of a key that is not designed to operate the vehicle to which the vehicle activity module is attached, and upon such detection, the inventory management system activates the alarm to indicate that an improper key has been returned, wherein the alarm is selected from the group consisting of: an audio alarm on the vehicle to which the vehicle activity module is attached; an electronic mail notification to a predetermined email address; an electronic notification delivered via a cell phone; and combinations thereof.

52. The inventory management system of claim 49, further comprising a user interface program that permits an authorized user to run queries on information contained in the database.

53. The inventory management system of claim 52, wherein the user interface program is configured to be accessed from a location remote from the system computer by either a local area network or the Internet.

54. The inventory management system of claim 49, wherein the alarm includes at least one of the following: an audio alarm that is sounded over a wide area including at least a portion of the geographical area in which the inventory of vehicles are located; an audio alarm on one or more of said plurality of vehicles; an electronic notification to local police; an electronic notification to a local security office; a visual disturbance warning; an electronic alert sent over the internet; an electronic mail notification to a predetermined email address; and an electronic alert delivered via cell phone.

55. The inventory management system of claim 49, wherein the system computer sets a flag when the activity sensor permits access to the key container containing a key, and if the key sensor does not detect the return of the key within a predetermined time period, the system computer activates the alarm to indicate that the key has not been returned, wherein the alarm is selected from the group consisting of: an audio alarm on the vehicle whose key has not been returned; an electronic mail notification to a predetermined email address; an electronic notification delivered via a cell phone; and combinations thereof.

56. The inventory management system of claim 54, wherein the system computer sets a flag when the activity sensor permits access to the key container containing a key, and if the key sensor does not detect the return of the key within a predetermined time period, the system computer activates the alarm to indicate that the key has not been returned.

\* \* \* \* \*